(12) United States Patent   (10) Patent No.: US 8,781,088 B2
Nakayama                    (45) Date of Patent:      Jul. 15, 2014

(54) COMMUNICATION DEVICE, AND COMPUTER READABLE MEDIUM AND CONTROL METHOD FOR THE SAME

(75) Inventor: Hiroto Nakayama, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 257 days.

(21) Appl. No.: 13/333,215

(22) Filed: Dec. 21, 2011

(65) Prior Publication Data

US 2012/0166881 A1    Jun. 28, 2012

(30) Foreign Application Priority Data

Dec. 22, 2010   (JP) ................................. 2010-286670

(51) Int. Cl.
*H04M 11/00* (2006.01)
(52) U.S. Cl.
USPC ...................................... 379/100.12; 370/230
(58) Field of Classification Search
USPC .................................... 379/100.01–108.02
See application file for complete search history.

(56) References Cited

U.S. PATENT DOCUMENTS

| | | | | |
|---|---|---|---|---|
| 5,577,108 A * | 11/1996 | Mankovitz | ................. | 379/93.26 |
| 5,796,493 A | 8/1998 | Murai et al. | | |
| 5,798,848 A | 8/1998 | Ouchi | | |
| 6,226,096 B1 | 5/2001 | Ouchi | | |
| 6,359,697 B1 * | 3/2002 | Nagata et al. | ................. | 358/1.15 |
| 6,526,467 B1 * | 2/2003 | Joh | ............... | 710/305 |
| 6,697,073 B1 | 2/2004 | Kadota | | |
| 6,891,861 B1 | 5/2005 | Odaira | | |
| 6,934,045 B1 * | 8/2005 | Vialle et al. | ................... | 358/1.15 |
| 7,313,698 B2 | 12/2007 | Maekawa et al. | | |
| 7,522,304 B2 | 4/2009 | Mori | | |
| 7,523,407 B2 | 4/2009 | Ito | | |
| 7,679,761 B2 | 3/2010 | Kato | | |

(Continued)

FOREIGN PATENT DOCUMENTS

| | | |
|---|---|---|
| JP | 2000-244677 | 9/2000 |
| JP | 2004-112516 A | 4/2004 |

(Continued)

OTHER PUBLICATIONS

Notification of Reasons for Rejection dated Dec. 18, 2012 received from the Japanese Patent Office from related Japanese Application No. 2010-286670, together with an English-language translation.

*Primary Examiner* — Duc Nguyen
*Assistant Examiner* — Assad Mohammed
(74) *Attorney, Agent, or Firm* — Scully, Scott, Murphy & Presser, P.C.

(57) ABSTRACT

A communication device configured to be connected with a public network and an IP network is provided, the communication device including a communication controller that selectively performs one of a public line communication process via the public network and an IP communication process via the IP network. When determining that a redialing process to reattempt the IP communication process via the IP network is unlikely to be successfully performed, the communication controller performs a fallback process to attempt the public line communication process via the public network after switching from the IP communication process via the IP network to the public line communication process via the public network, in a situation where a setting for performing the fallback process is configured. When determining that the redialing process via the IP network is not unlikely to be successfully performed, the communication controller performs the redialing process.

15 Claims, 7 Drawing Sheets

(56) References Cited

U.S. PATENT DOCUMENTS

| | | |
|---|---|---|
| 7,684,412 B2 | 3/2010 | Ohara |
| 7,720,205 B2 * | 5/2010 | Kawabata et al. ....... 379/100.12 |
| 2004/0057421 A1 | 3/2004 | Kawabata et al. |
| 2004/0153516 A1 | 8/2004 | Maekawa et al. |
| 2004/0190074 A1 | 9/2004 | Kato |
| 2005/0223332 A1 | 10/2005 | Ito |
| 2006/0017976 A1 | 1/2006 | Mori |
| 2007/0011354 A1 | 1/2007 | Ohara |
| 2007/0076595 A1 * | 4/2007 | Lee et al. ...................... 370/222 |

FOREIGN PATENT DOCUMENTS

| | | |
|---|---|---|
| JP | 2005-269250 A | 9/2005 |
| JP | 2006-054539 | 2/2006 |
| JP | 2007-208348 | 8/2007 |
| JP | 2012-004910 | 1/2012 |

\* cited by examiner

COMMUNICATION DEVICE, AND COMPUTER READABLE MEDIUM AND CONTROL METHOD FOR THE SAME

CROSS-REFERENCE TO RELATED APPLICATION

This application claims priority under 35 U.S.C. §119 from Japanese Patent Application No. 2010-286670 filed on Dec. 22, 2010. The entire subject matter of the application is incorporated herein by reference.

BACKGROUND

1. Technical Field

The following description relates to one or more techniques for a communication device configured to perform communication using a public network and an Internet Protocol (IP) network.

2. Related Art

A communication terminal device has been known, which is connected with an IP (Internet Protocol) network and a public network. The communication terminal device is configured to detect a communication error when making a call to the IP network or the public line network. When detecting a communication error, the communication terminal device analyzes the detected communication error to obtain an analysis result as to whether the detected communication error is a network selection error (i.e., such an error as "Not Found" under which redialing to the same network is ineffective) or an error other than the network selection error (e.g., an error indicating that a party device is busy). Then, the communication terminal automatically determines whether to make redialing to the IP network or the public network based on the analysis result regarding the communication error.

SUMMARY

The known communication terminal device determines whether to make redialing to the IP network or the public network depending on the kind of the error. In this case, for example, even when a user does not wish to perform communication using the public network (for the reason that the communication via the IP network provides more advantages, such as a lower cost and a higher communication speed, than the communication via the public network), redialing might be made to the public network.

Aspects of the present invention are advantageous to provide one or more improved techniques that make it possible to resolve the aforementioned problem.

According to aspects of the present invention, a communication device configured to be connected with a public network and an IP network is provided. The communication device includes a communication controller configured to selectively perform one of a public line communication process via the public network using general identification data for the public network and an IP communication process via the IP network using IP identification data for the IP network, a setting unit configured to configure a setting as to whether to perform a fallback process to attempt the public line communication process via the public network after switching from the IP communication process via the IP network to the public line communication process via the public network, a first detector configured to detect whether the IP communication process is successfully performed and to acquire communication error information when detecting that the IP communication process is not successfully performed, and a first determining unit configured to determine whether a redialing process to reattempt the IP communication process via the IP network is unlikely to be successfully performed, based on the communication error information acquired by the first detector. When the first determining unit determines that the redialing process via the IP network is unlikely to be successfully performed, the communication controller performs the fallback process in a situation where the setting for performing the fallback process is configured by the setting unit. When the first determining unit determines that the redialing process via the IP network is not unlikely to be successfully performed, the communication controller performs the redialing process.

According to aspects of the present invention, further provided is a non-transitory computer readable medium having computer readable instructions stored thereon, which, when executed by a processor connected with a public network and an IP network, cause the processor to selectively perform one of a public line communication process via the public network using general identification data for the public network and an IP communication process via the IP network using IP identification data for the IP network, configure a setting as to whether to perform a fallback process to attempt the public line communication process via the public network after switching from the IP communication process via the IP network to the public line communication process via the public network, determine whether the IP communication process is successfully performed, acquire first communication error information when determining that the IP communication process is not successfully performed, determine whether a redialing process to reattempt the IP communication process via the IP network is unlikely to be successfully performed, based on the first communication error information, perform the fallback process in a situation where the setting for performing the fallback process is configured, when determining that the redialing process via the IP network is unlikely to be successfully performed, and perform the redialing process, when determining that the redialing process via the IP network is not unlikely to be successfully performed.

According to aspects of the present invention, further provided is a control method adapted to be implemented by a processor connected with a public network and an IP network. The control method includes the steps of selectively performing one of a public line communication process via the public network using general identification data for the public network and an IP communication process via the IP network using IP identification data for the IP network, configuring a setting as to whether to perform a fallback process to attempt the public line communication process via the public network after switching from the IP communication process via the IP network to the public line communication process via the public network, determining whether the IP communication process is successfully performed, acquiring communication error information when determining that the IP communication process is not successfully performed, determining whether a redialing process to reattempt the IP communication process via the IP network is unlikely to be successfully performed, based on the communication error information, performing the fallback process in a situation where the setting for performing the fallback process is configured, when determining that the redialing process via the IP network is unlikely to be successfully performed, and performing the redialing process, when determining that the redialing process via the IP network is not unlikely to be successfully performed.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described with reference to the accompanying drawings.

First Embodiment (Configuration of System)

Figure 1:
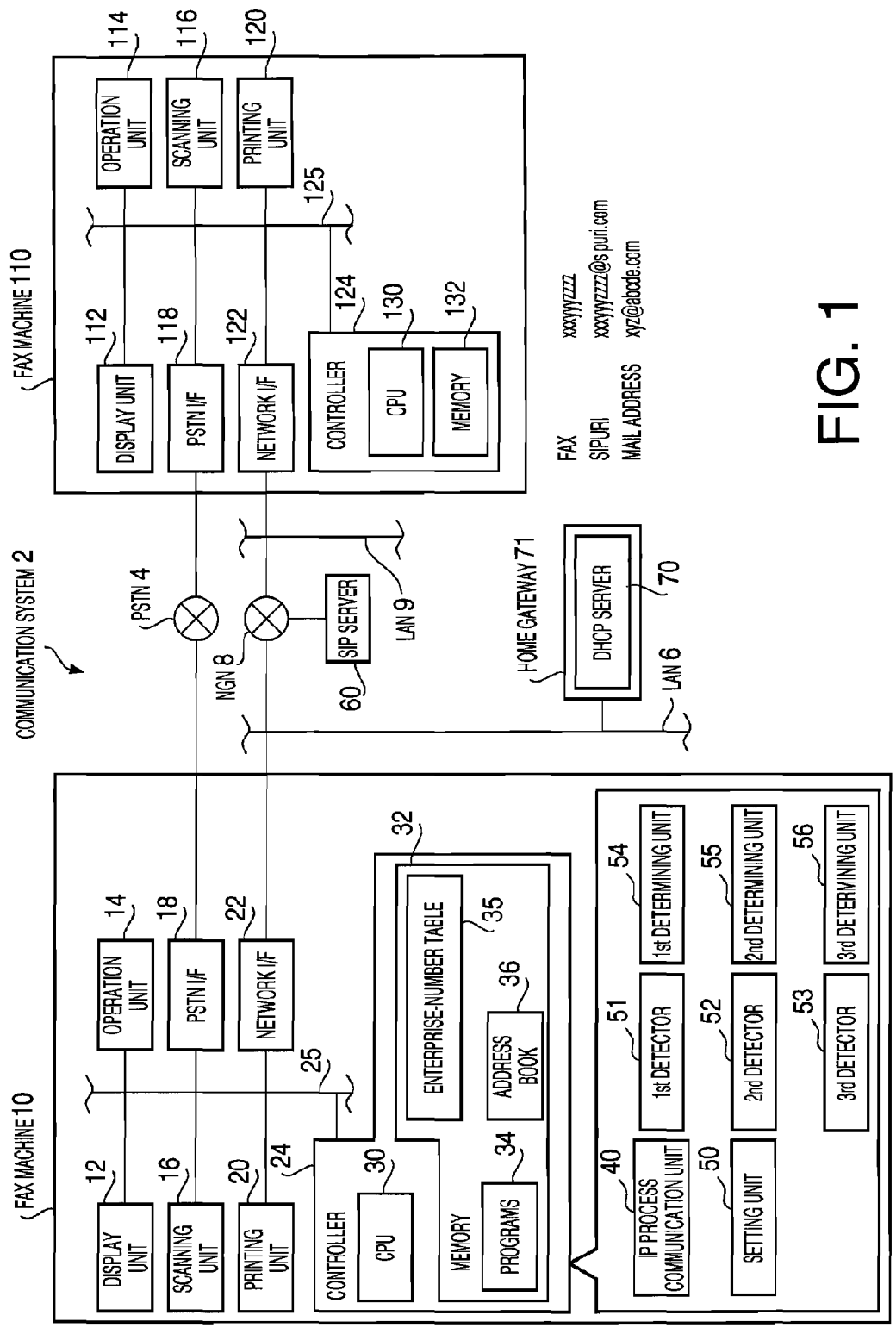
FIG. 1 is a block diagram schematically showing a configuration of a communication system in a first embodiment according to one or more aspects of the present invention.

As shown in FIG. 1, a communication system 2 of a first embodiment includes a public switched telephone networks (PSTN) 4, a next generation network (NGN) 8, a LAN 6, a LAN 9, facsimile (fax) machines 10 and 110, a session initiation protocol (SIP) server 60, and a home gateway 71.

The home gateway 71 mutually connects the NGN 8 and the LAN 6 and contributes to absorbing a network difference between the NGN 8 and the LAN 6. The home gateway 71 includes a dynamic host configuration protocol (DHCP) server 70.

The fax machines 10 and 110 are connected with the PSTN 4, so as to communicate with each other via the PSTN 4. The fax machine 10 and the home gateway 71 are connected with the LAN 6, so as to communicate with each other via the LAN 6. The fax machine 110 is connected with the LAN 9. The LAN 6, the LAN 9, and the SIP server 60 are connected with the NGN 8, so as to communicate with each other via the NGN 8.

The NGN 8 is an IP network provided by an Internet provider. The NGN 8 is controlled by the SIP server 60. Here, the "NGN" is a next-generation IP network that is expected to take the place of the existing public network. Namely, the "NGN" is an integrated network that coordinates an IP network for Internet services and a telephone network for telephone services, which networks are separately established at the present time, using IP technologies.

(Configuration of Fax Machine 10)

A configuration of the fax machine 10 will be described. The fax machine 10 has multiple functions such as a general fax function, an Internet protocol fax (IPFAX) function, a copy function, a printing function, and a scanning function. The general fax function is a function for performing fax data communication via the PSTN 4 using a general fax number, which is identification data for each fax machine required for performing communication via the PSTN 4. Examples of the general fax number include a telephone number (such as an OABJ number and an E. 164 number) assigned by a telecoms operator. Further, the IPFAX function is a function for performing fax data communication via the NGN 8 using an SIP uniform resource identifier (SIPURI).

The fax machine 10 includes a display unit 12, an operation unit 14, a scanning unit 16, a PSTN interface 18, a printing unit 20, a network interface 22, and a controller 24. It is noted that the aforementioned elements 12, 14, 16, 18, 20, 22, and 24 are connected with a bus line 25. The display unit 12 is configured to display thereon various kinds of information. The operation unit 14 is provided with a plurality of keys. A user can operate the operation unit 16 to input various instructions into the fax machine 10. The scanning unit 16 is provided with a scanning mechanism having a contact image sensor (CIS) or a CCD, and configured to scan an object such as a document sheet to create image data. The PSTN interface 18 is connected with the PSTN 4. The PSTN interface 18 is configured to perform a general fax transmission process using the general fax number via the PSTN 4. The printing unit 20 is provided with a printing mechanism of an inkjet printing type or a laser printing type, and configured to perform printing in accordance with instructions from the controller 24. The network interface 22 is connected with the LAN 6.

The controller 24 includes a CPU 30 and a memory 32. The memory 32 stores programs 34, an enterprise-number table 35, and an address book 36. The CPU 30 is configured to execute processes in accordance with the programs 34 stored on the memory 32. When the CPU 30 executes the processes in accordance with the programs 34, the fax machine 10 attains respective functions of an IP process communication unit 40, a setting unit 50, a first detector 51, a second detector 52, a third detector 53, a first determining unit 54, a second determining unit 55, and a third determining unit 56. The enterprise-number table 35 is a table for storing enterprise-numbers for providers (hereinafter, which may be referred to as "first-class providers") that can provide the fax machine 10 with a state where the fax machine 10 can use the IPFAX function. Each enterprise-number is an enterprise code number specific to a corresponding one of the providers. The address book 36 stores general fax numbers, SIPURIs, mail addresses, and telephone numbers that are registered by the user.

Further, the memory 32 stores various settings such as a fallback setting, an NGN transmission setting, and the maximum permissible number of redials. The fallback setting is a setting for determining whether to perform a below-mentioned fallback process (e.g., a process to make redialing using the PSTN 4 to replace the NGN 8 in a situation where the communication using the NGN 8 is unlikely to be successfully performed). The NGN transmission setting is a setting for determining whether to perform fax transmission using the NGN 8. The maximum permissible number of redials is a parameter that defines the upper limit of the number of repeated attempts of a below-mentioned redialing process (e.g., a process to make redialing using an intended one of the NGN 8 and the PSTN 4 after waiting for a predetermined time in a situation where the communication using the intended network is temporarily unavailable). These settings may previously be set by the user.

Further, the memory 32 temporarily stores a parameter for line selection, a line determination result, a fax job, and the number of redials. The parameter of line selection is a parameter for determining which line of the NGN 8 and the PSTN 4 is used for fax transmission. The line determination result is a result of determination made in a below-mentioned line type determining process (see FIG. 4). The fax job is a job concerning fax transmission. The number of redials is the number of repeated attempts of the below-mentioned redialing process. These settings may be stored onto the memory 32 by the CPU 30.

(Configuration of SIP Server)

A configuration of the SIP server 60 will be described. The SIP server 60 stores an IP address and a SIPRI assigned to each of the fax machines 10 and 110, in association with each other. The SIP server 60 is connected with the NGN 8. The SIP server 60 controls communication between the fax machines 10 and 110, using the SIP. Namely, for instance, various commands exchanged between the fax machines 10 and 110 for performing an IPFAX transmission process are transmitted via the SIP server 60.

(Configuration of DHCP Server)

Configuration of the DHCP server 70 will be described. The DHCP server 70 is connected with the LAN 6. The DHCP server 70 assigns an IP address to each device (such as the fax machine 10) connected with the LAN 6.

(Configuration of Fax Machine 110)

The fax machine 110 is provided with the same functions as those of the fax machine 10. The fax machine 110 includes a display unit 112, an operation unit 114, a scanning unit 116, a PSTN interface 118, a printing unit 120, a network interface 122, and a controller 124. It is noted that the aforementioned elements 112 to 124 are connected with a bus line 125. The aforementioned elements 112 to 124 are configured in the same manner as the elements 12 to 24 of the fax machine 10, respectively. The controller 124 includes a CPU 130 and a memory 132, in the same manner as the controller 24. In the first embodiment, a general fax number "xxxyyyzzzz" and a SIPURI "xxxyyyzzzz@sipuri.com" are assigned to the fax machine 110 (see FIG. 1). The SIPURI of the fax machine 110 contains the general fax number of the fax machine 110. More specifically, the SIPURI for the fax machine 110 is formed with the general fax number for the fax machine 110 having a domain of the SIP server 60 "sipuri.com" added thereto. The general fax number, the SIPURI, and a mail address of the fax machine 110 are registered on the address book 36 of the fax machine 10.

(Configuration of Communication System)

A configuration of the communication system 2 shown in FIG. 1 will be described. The communication system 2 shown in FIG. 1 is configured such that the fax machine 10 is connectable with the NGN 8. In this case, the user needs to conclude a communication contract with a provider that provides the NGN 8. It is noted that, in the following description, a provider with which the user has concluded a contract will be referred to as a "contract provider."

There are two types of providers, i.e., a first-class provider and a second-class provider. As described above, the first-class provider is a provider that can provide the IPFAX function using the SIPURI to the fax machine 10. When the user concludes a contract with a first-class provider, the SIPURI assigned to the fax machine 10 contains the general fax number assigned to the fax machine 10. Specifically, the SIPURI "xxxyyyzzzz@sipuri.com" for the fax machine 110 contains the general fax number "xxxyyyzzzz" for the fax machine 110. Further, the second-class provider is a provider that cannot put the fax machine 10 into a state where the fax machine 10 can use the IPFAX function using the SIPURI. Examples of the second-class provider include a provider that does not provide any IPFAX function. Further, a case where a provider provides the IPFAX function as an optional function but the user does not select the optional function. In the first embodiment, an explanation will be provided about a case where the contract provider providing the NGN 8 is classified into the first-class provider.

In this case, the IP address for the SIP server 60 that the contract provider provides and the enterprise-number for the contract provider are previously registered in the DHCP server 70. Thereby, the DHCP server 70 includes "option 120" (the IP address for the SIP server 60) and "option 125" (provider information indicating the contract provider) in below-mentioned DHCP information. Further, the enterprise-number for the contract provider is stored on the enterprise-number table 35 of the fax machine 10. It is noted that registration of information such as the IP address for the SIP server 60 and the enterprise-number for the contract provider into the DHCP server 70 may be carried out by the contract provider.

In the first embodiment, on the NGN 8 that the contract provider provides, the SIP server 60 converts a general fax number (e.g., an OABJ number or an E. 164 number) into an URI, so as to change the general fax number into a unique address on the network. Thus, in the first embodiment, since the general fax number is converted into the SIPURI by the SIP server 60 on the NGN 8 (namely, mapping between the SIPURI and the general fax number is implemented), when the user attempts to perform fax transmission, the user has only to input the general fax number for a destination device into the fax machine 10. Thereby, the IP address for the destination device is issued by the SIP server 60, and a connection between the fax machine 10 and the destination device is established to allow the fax machine 10 to perform an IPFAX process. Thus, it is possible to enhance user-friendliness of the communication system 2.

According to the IPFAX process using the NGN 8, it is possible to perform high-security transmission of image data at a high speed (more than 9600 bps) in real time (namely, without once storing the image data into a server). Further, at that time, the image data transmission is performed using the NGN 8. Thus, in the same manner as the conventional telephone line (PSTN), the IPFAX process using the NGN 8 makes it possible to perform image data transmission among an unspecified number of enterprises, instead of fax transmission. Especially, when the NGN 8 of the contract provider is used, the destination device is specified by the telephone number therefor under control of the contract provider. Therefore, since a third party can hardly spoof as if it were the destination device, it is possible to enhance security against spoofing.

(Processes by Fax Machine 10)

Subsequently, referring to FIGS. 2 to 6, explanations will be provided about processes to be executed by the controller 24 of the fax machine 10.

(Main Process (First Phase))

Figure 2:
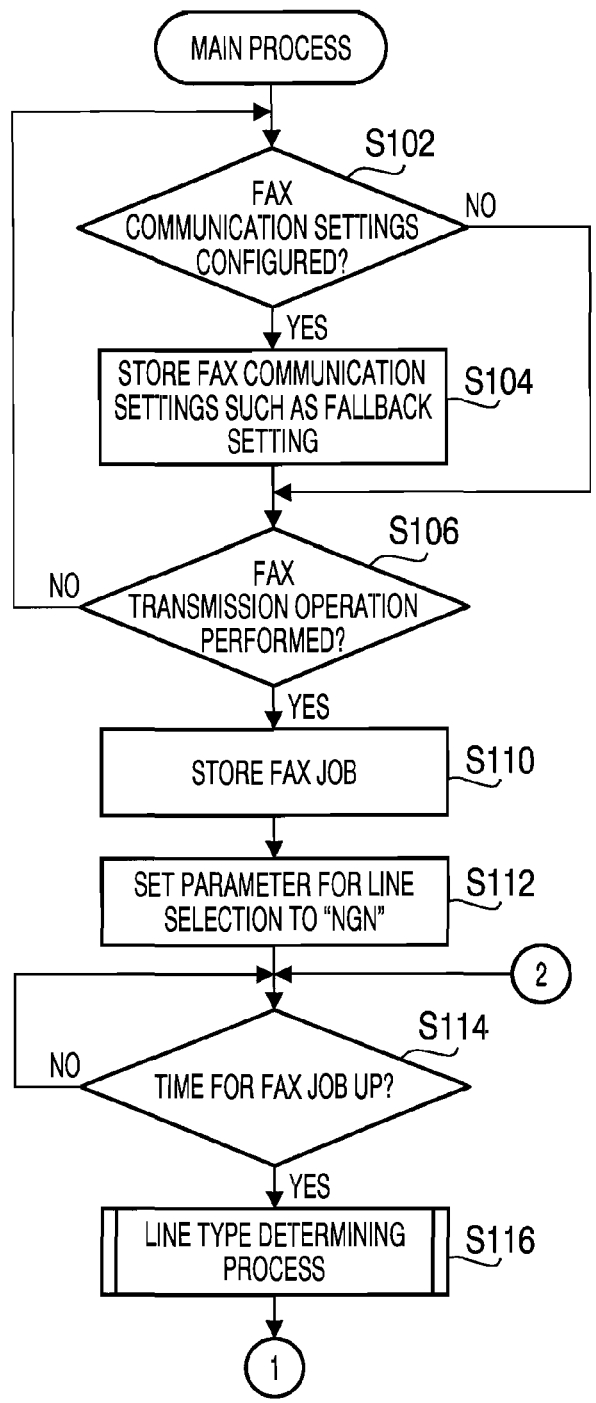
FIGS. 2 and 3 are flowcharts showing a procedure of a main process to be executed by (a CPU of) a fax machine included in the communication system in the first embodiment according to one or more aspects of the present invention.

An explanation will be provided about a main process to be executed by the fax machine 10 with reference to FIG. 2. In S102, the CPU 30 (the setting unit 50) determines whether fax communication settings (such as the fallback setting, the NGN transmission setting, and the maximum permissible number of redials) are configured. When the setting unit 50 determines that the fax communication settings are not configured (S102: No), the CPU 30 skips S104 and goes to S106. Meanwhile, when the user operates the operation unit 14 to configure the fax communication settings (S102: Yes), the CPU 30 goes to S104. In S104, the setting unit 50 stores onto the memory 32 the fax communication settings such as the fallback setting.

In S106, the CPU 30 determines whether a fax transmission operation is performed. Specifically, the CPU 30 waits the user to input identification data for a destination device through the operation unit 14. Examples of the identification data for the destination device include the general fax number (in the first embodiment, the general fax number "xxx-yyyzzzz" for the fax device 110). When determining that the fax transmission operation is not performed (S106: No), the CPU goes back to S102. Meanwhile, when determining that the fax transmission operation is performed (S106: Yes), the CPU goes to S110.

In S110, the CPU 30 stores a fax job onto the memory 32. In S112, the CPU 30 sets the parameter for line selection to an initial setting "NGN." The parameter for line selection is set for each fax job.

S114, the CPU 30 determines whether time is up on a timer for the fax job (namely, whether a time measured by the timer reaches a predetermined time (e.g., five minutes)). When determining that time is not up (S114: No), the CPU 30 goes back to S114 to wait in a standby state. When determining that time is up (S114: Yes), the CPU 30 goes to S116, in which the CPU 30 performs a line type determining process ahead of making a call.

(Line Type Determining Process)

The line type determining process to be executed in S116 will be described with reference to FIG. 4. In S200, after reading out the parameter for line selection from the memory 32, the CPU 30 determines whether the parameter for line selection is "NGN." When determining that the parameter for line selection is not "NGN" (S200: No), the CPU 30 goes to S224. Meanwhile, when determining that the parameter for line selection is "NGN" (S200: Yes), the CPU 30 goes to S201.

In S201, after reading out the NGN transmission setting from the memory 32, the CPU 30 determines whether the NGN transmission setting is set to "ON." When determining that the NGN transmission setting is set to "OFF" (S201: No), the CPU 30 goes to S224. Meanwhile, when determining that the NGN transmission setting is set to "ON" (S201: Yes), the CPU 30 goes to S202.

In S202, the CPU 30 searches the DHCP server. Specifically, the CPU 30 broadcasts a search command for searching the DHCP server 70 connected with the LAN 6. Each device connected with the LAN 6 receives the search command. The DHCP server 70 connected with the LAN 6 transmits to the fax device 10 a response packet containing the IP address for the DHCP server 70, in response to receipt of the search command.

In S204, the CPU 30 determines whether the CPU 30 has found the DHCP server. Specifically, when receiving the response packet in a predetermined time after broadcasting the search command, the CPU 30 determines that the CPU 30 has found the DHCP server (S204: Yes). When determining that the CPU 30 has not found the DHCP server (S204: No), the CPU 30 goes to S224.

In S206, the CPU 30 sends to the DHCP server 70 a request command for requesting transmission of DHCP information. The CPU 30 sends the request command to the IP address for the DHCP server 70 that is contained in the response packet received from the DHCP server 70. The request command is a command for requesting the option 120 and the option 125. The option 120 contains the IP address for the SIP server 60 that the contract provider provides. Further, the option 125 contains the enterprise-number indicating the contract provider. Responsive to receipt of the request command, the DHCP server 70 sends, to the fax device 10, the DHCP information that includes various kinds of information corresponding to the request command. In S208, the CPU 30 receives the DHCP information from the DHCP server 70.

In S210, the CPU 30 determines whether the received DHCP information includes the option 120. For example, when the IP address for the SIP server 60 that the contract provider provides is previously registered in the retrieved DHCP server, the DHCP information includes the option 120 that indicates the IP address for the SIP server 60. In this case, the CPU 30 determines that the received DHCP information includes the option 120 (S210: Yes), and goes to S212.

Meanwhile, when the TP address of the SIP server 60 that the contract provider provides is not registered in the retrieved DHCP server, the DHCP information does not include the option 120. In this case, since the CPU 30 cannot communicate with the SIP server 60, the CPU 30 determines that the IPFAX function is unavailable (S210: No), and goes to S224.

In S212, the CPU 30 determines whether the received DHCP information includes the option 125. For example, when the enterprise-number for the contract provider is registered in the retrieved DHCP server, the DHCP information includes the option 125 that indicates the enterprise-number for the contract provider. In this case, the CPU 30 determines that the received DHCP information includes the option 125 (S212: Yes), and goes to S214. Meanwhile, for instance, when the enterprise-number for the contract provider is not registered in the retrieved DHCP server, the DHCP information does not include the option 125. In this case, the CPU 30 determines that the IPFAX function is unavailable (S212: No), and goes to S224.

It is noted that there may be cases where fax communication using an IP network is performed without involving any contract provider, such as a case where the SIP server 60 is connected with the LAN 6. In this case, the DHCP server 70 stores the value of the option 120 but not the value of the option 125. In this case as well, the CPU 30 determines that the IPFAX function is unavailable (S212: No).

In S214, the CPU 30 determines whether the enterprise-number contained in the option 125 is identical to one of the enterprise-numbers listed on the enterprise-number table 35 (see FIG. 1). The present embodiment is described under an assumption that the enterprise-number for the contract provider is stored on the enterprise-number table 35. Namely, in S214, the CPU 30 determines whether the enterprise-number contained in the option 125 is identical to the enterprise-number for the contract provider. When determining that the enterprise-number contained in the option 125 is not identical to the enterprise-number for the contract provider (S214: No), the CPU 30 determines that the IPFAX function is unavailable as the fax machine 10 is not connected with the NGN 8 that the contract provider (which can provide the IPFAX function) provides. Then, the CPU 30 goes to S224. Meanwhile, when determining that the enterprise-number contained in the option 125 is not identical to the enterprise-number for the contract provider (S214: Yes), the CPU 30 determines that the fax machine 10 can use the IPFAX function, and goes to S216.

In S216, the CPU 30 stores onto the memory 32 the value of the option 120 as the IP address for the SIP server 60. Further, in S222, the CPU 30 stores onto the memory 32 a line determination result "beginning to make a call via NGN." Then, the CPU 30 terminates the line type determining process.

Meanwhile, when making negative determination in one of the steps S200, S201, S204, S210, S212, and S214 (S200: No, S201: No, S204: No, S210: No, S212: No, or S214: No), the CPU 30 goes to S224. In S224, after reading out the fallback setting from the memory 32, the CPU 30 determines whether the fallback setting is set to "ON." When determining that the fallback setting is set to "ON" (S224: Yes), the CPU 30 goes to S230 to set the parameter for line selection to "PSTN." Additionally, in S232, the CPU 30 stores onto the memory 32 a line determination result "beginning to make a call via PSTN."

Further, when determining in S224 that the fallback setting is not set to "ON" (S224: No), the CPU 30 goes to S226, in which the CPU 30 displays on the display unit 12 error information that it is impossible to perform fax communication. Additionally, in S228, the CPU 30 stores onto the memory 32 a line determination result "termination of the call via NGN." Then, the CPU 30 terminates the line type determining process.

(Main Process (Second Phase))

Subsequent operations of the main process will be described with reference to FIG. 3. After completing the line type determining process (S116), the CPU 30 goes to S118 (see FIG. 3). In S118, the CPU 30 reads out the line determination result stored on the memory 32. When the line determination result is "termination of the call via NGN" (S118: termination of the call via NGN), the CPU 30 terminates the main process. Further, when the line determination result is "beginning to make a call via PSTN" (S118: beginning to make a call via PSTN), the CPU 30 goes to S154. Further, when the line determination result is "beginning to make a call via NGN" (S118: beginning to make a call via NGN), the CPU 30 goes to S140.

The CPU 30 reads out the IP address for the SIP server 60 and an SIP domain name of the SIP server 60 from the memory 32 (S140). In S140, since the fax machine 10 is in a state where the IPFAX function is available (the contract provider is the first-class provider), the CPU 30 reads out the IP address stored onto the memory 32 in S216 of FIG. 4. Further, the CPU 30 reads out the SIP domain name of the SIP server 60 stored onto the memory 32 in the aforementioned predetermined storing operation. Subsequently, the CPU 30 generates the SIPURI "xxxyyyzzzz@sipuri.com" (see FIG. 1) for the destination device, i.e., the fax machine 110 from the SIP domain name (sipuri.com) read out in S140 and the identification data (the fax number "xxxyyyzzzz") acquired in S106 (S142).

Next, the CPU 30 sends "INVITE" to the SIP server 60 with the SIPURI generated in S142 set as the destination (S144). The SIP server 60 transfers the INVITE to the fax machine 110. When receiving the INVITE, the fax machine 110 sends "200 OK" to the SIP server 60. The SIP server 60 transfers the 200 OK to the fax machine 10.

After receiving the INVITE, the CPU 30 monitors whether the CPU 30 has received the 200 OK (S146). When determining that the CPU 30 has received the 200 OK from the SIP server 60 (S146: Yes), the CPU 30 sends "ACK" to the SIP server 60 with the SIPURI set as the destination (S148). The SIP server 60 transfers the ACK to the fax machine 110. The fax machine 110 receives the ACK. Thereby, a communication session is established between the fax machine 10 and the fax machine 110 (S150). Subsequently, the IP process communication unit 40 transmits the fax data acquired in S132 to the fax machine 110 via the NGN 8, without involving the SIP server 60 (S152).

In S160, the first detector 51 determines whether the fax data transmission has successfully been completed. The determination is made based on whether a response indicating a transmission error is received. When the first detector 51 determines that the fax data transmission has successfully been completed (S160: Yes), the CPU terminates the main process. Meanwhile, when the first detector 51 determines that the fax data transmission has not successfully been completed (S160: No), the CPU 30 goes to S162.

In S162, the CPU 30 performs an error result registering process. The error result registering process will be described later. In S164, the CPU 30 determines whether the fax job is set to "Redialing." When determining that the fax job is not set to "Redialing" (S164: No), the CPU 30 terminates the main process. Meanwhile, when determining that the fax job is set to "Redialing" (S164: Yes), the CPU 30 goes back to S114.

Further, in S118, when the line determination result is "beginning to make a call via PSTN," the CPU 30 goes to S154. In S154, the CPU 30 makes a call via the PSTN 4 with the general fax number "xxxyyyzzzz" acquired in S106 set as the destination, so as to establish a communication pathway. After a communication pathway is established between the fax machine 10 and the fax machine 110, in S156, the CPU 30 transmits the fax data to the fax machine 110 via the PSTN 4.

In S161, the third detector 53 determines whether the fax data transmission has successfully been completed. The determination is made based on whether a response indicating a transmission error is received. When the third detector 53 determines that the fax data transmission has successfully been completed (S161: Yes), the CPU terminates the main process. Meanwhile, when the third detector 53 determines that the fax data transmission has not successfully been completed (S161: No), the CPU 30 goes to S162. It is noted that the operations following S162 have already been described. Therefore, a detailed explanation about the operations following S162 will be omitted.

(Error Result Registering Process)

Figure 5:
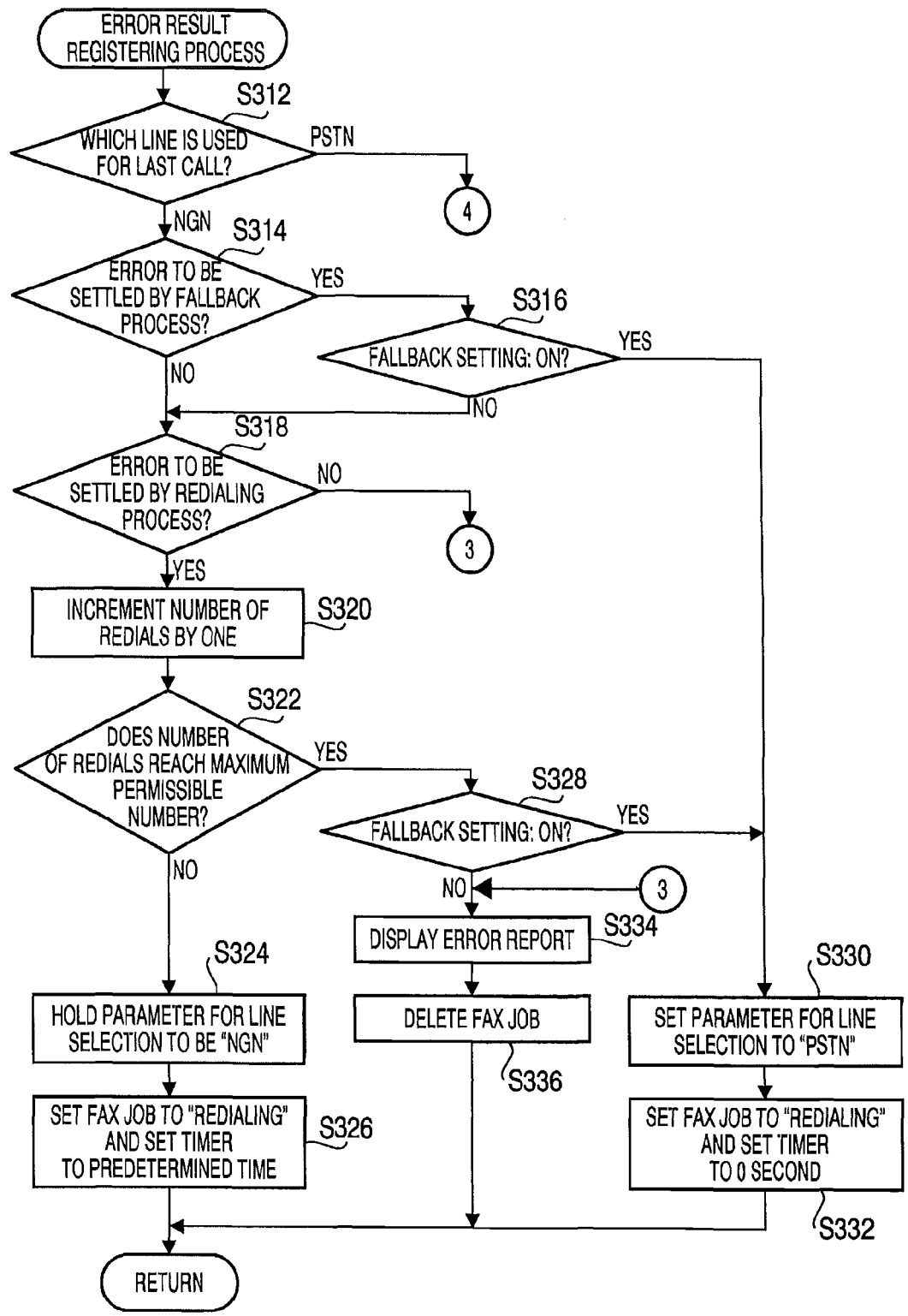
FIGS. 5 and 6 are flowcharts showing a procedure of an error result registering process to be executed by (the CPU of) the fax machine in the first embodiment according to one or more aspects of the present invention.

The error result registering process to be executed in S162 will be described with reference to FIGS. 5 and 6. In S312, the CPU 30 identifies the type of the line used for the last call. When determining that the line used for the last call is the NGN 8, the CPU 30 goes to S314. In S314, the CPU 30 (an example of the first determining unit 54) determines whether the caused error is to be settled by the fallback process. The determination is made by analyzing the caused error (examining what kind of error the caused error is) based on a response received from the NGN 8 or the party device (i.e., the fax machine 110). The error to be settled by the fallback process is such an error that the communication using the NGN 8 is unlikely to be successfully performed. Namely, it is an error to be issued in a situation where the communication using the NGN 8 is unlikely to be available even by making redialing via the NGN 8 after a predetermined time. Examples of the error to be settled by the fallback process include "404 Not Found," "488 Not Acceptable Here," "403 Forbidden," and "Communication Error." The "404 Not Found" is an error to be issued in a situation where the party device is not connected with the NGN 8 (the number for the party device is not registered in the SIP server 60). The "488 Not Acceptable Here" is an error to be issued, for instance, in a situation where the party device is connected with the NGN 8 but does not comply with T.38 (a protocol defining a method for fax transmission on a computer data network) or a situation where a cable for connecting the party device with the home gateway at the side of the party device is disconnected. The "403 Forbidden" is an error to be issued in a situation where the party device is not connected with the NGN 8 (the number for the party device is registered in the SIP server 60, but the home gateway at the side of the party device is not powered on). The "Communication Error" is an error to be issued when the communication fails for one or more causes. Examples of the "Communication Error" include a time-out error in communication with the SIP server 60. Further, the examples of the "Communication Error" include an error in fax communication, which is performed based on T.38 (S152) after the communication session has been established between the fax machine 10 and the fax machine 110 (S150). Examples of the error in the fax communication include a case where the fax machine 10 receives an improper command (data) from the party device (i.e., the fax machine 110) during the fax communication and a case where data communication is rendered unavailable during the fax communication (for instance, for such a reason that a cable is rendered unconnected). When the first determining unit 54 determines that the caused error is not to be settled by the fallback process (S314: No), the CPU 30 goes to S318. Meanwhile, when the first determining unit 54 determines that the caused error is to be settled by the fallback process (S314: Yes), the CPU 30 goes to S316.

In S316, the CPU 30 (the IP process communication unit 40) determines whether the fallback setting is set "ON." When the IP process communication unit 40 determines that the fallback setting is set "ON" (S316: Yes), the CPU 30 goes to S330. In S330, the CPU 30 sets the parameter for line selection to "PSTN." In S332, the IP process communication unit 40 sets the fax job to "Redialing" and sets the timer to zero second. Then, the CPU 30 terminates the error result registering process. Meanwhile, in S316, when the IP process communication unit 40 determines that the fallback setting is not set "ON" (S316: No), the CPU 30 goes to S318.

In S318, the CPU 30 (an example of the second determining unit 55) determines whether the error caused in the case where the NGN 8 is used for the last call is an error to be settled by the redialing process. The determination is made as well by analyzing the caused error based on a response received from the NGN 8 or the party device. The error to be settled by the redialing process is such an error that the attempted communication is temporarily unavailable. Namely, it is an error to be issued in a situation where the communication using the NGN 8 is likely to be rendered available by making redialing after a predetermined time. Examples of the error, in the case where the NGN 8 is used for the last call, to be settled by the redialing process include "486 Busy Here" and "480 Temporarily Unavailable." The "486 Busy Here" is an error to be issued when the NGN 8 is busy. The "480 Temporarily Unavailable" is an error to be issued in a situation where the party device is not ready to perform communication for some reason (for instance, a situation where the party device cannot receive fax data for such a reason as an insufficient memory capacity and an out-of-toner state). When the second determining unit 55 determines that the error caused in the case where the NGN 8 is used for the last call is not an error to be settled by the redialing process (S318: No), the CPU 30 goes to S334. Meanwhile, when the second determining unit 55 determines that the error caused in the case where the NGN 8 is used for the last call is an error to be settled by the redialing process (S318: Yes), the CPU 30 goes to S320.

In S320, the CPU 30 increments the number of redials stored on the memory 32 by one. In S322, the second detector 52 determines whether the number of redials reaches the maximum permissible number of redials. When the second detector 52 determines that the number of redials reaches the maximum permissible number of redials (S322: Yes), the CPU 30 goes to S328. In S328, the CPU 30 determines whether the fallback setting is set "ON." When determining that the fallback setting is set "ON" (S328: Yes), the CPU 30 goes to S330. Meanwhile, when determining that the fallback setting is not set "ON" (S328: No), the CPU 30 goes to S334. In S334, the CPU 30 displays, on the display unit 12, an error report that the number of redials reaches the maximum permissible number of redials. Thereby, the CPU 30 informs the user that a communication process is unavailable. In S336, the CPU 30 deletes the fax job stored on the memory 32. Then, the CPU 30 terminates the error result registering process.

Meanwhile, when the second detector 52 determines that the number of redials does not reach the maximum permissible number of redials (S322: No), the CPU 30 goes to S324. In S324, the CPU 30 holds the parameter for line selection stored on the memory 32 to be still "NGN." In S326, the CPU 30 sets the fax job to "Redialing." Further, the CPU 30 sets the timer to a predetermined time (for example, five minutes). Then, the CPU 30 terminates the error result registering process.

Further, in S312, when determining that the PSTN 4 is used for the last call (S312: PSTN), the CPU 30 goes to S348 (see FIG. 6). In S348, the CPU 30 (the third determining unit 56) determines whether the error caused in the case where the PSTN 4 is used for the last call is an error to be settled by the redialing process. The determination is made as well by analyzing the caused error based on a response received from the PSTN 4 or the party device (i.e., the fax machine 110). Examples of the error, to be settled by the redialing process, in the case where the PSTN 4 is used for the last call include "No Response" and "Busy." When the third determining unit 56 determines that the error caused in the case where the PSTN 4 is used for the last call is not an error to be settled by the redialing process (S348: No), the CPU 30 goes to S334 (see FIG. 5). When the third determining unit 56 determines that the error caused in the case where the PSTN 4 is used for the last call is an error to be settled by the redialing process (S348: Yes), the CPU 30 goes to S350.

In S350, the CPU 30 increments the number of redials stored on the memory 32 by one. In S352, the CPU 30 determines whether the number of redials reaches the maximum permissible number of redials. When determining that the number of redials reaches the maximum permissible number of redials (S352: Yes), the CPU 30 goes to S334 (see FIG. 5). Meanwhile, when determining that the number of redials does not reach the maximum permissible number of redials (S352: No), the CPU 30 goes to S354. In S354, the CPU 30 changes the parameter for line selection stored on the memory 32 to "NGN." In S356, the CPU 30 sets the fax job to "Redialing." Further, the CPU 30 sets the timer to a predetermined time (for example, five minutes). Then, the CPU 30 terminates the error result registering process.

It is noted that the time (for example, zero second) set for the timer in the fallback process (S332) is shorter than the time (for example, five minutes) set for the timer in the redialing process (S326 and S356). The redialing process is a process to be executed in a situation where the communication using the NGN 8 is temporarily unavailable. Meanwhile, the fallback process is a process to be executed in a situation where the communication using the NGN 8 is unlikely to be successfully performed. Thus, since redialing in the fallback process is made at intervals of a shorter time than the time interval for redialing in the redialing process, it is possible to shorten a time required for successfully completing communication in the fallback process.

(Operations)

Actual operations will be exemplified with reference to FIGS. 2 to 6. In the following description, three operation patterns A, B, and C will be described under an assumption that the same error is again caused in each operation pattern.

The pattern A will be described. The pattern A is an operation pattern in which the fax machine 10 (the CPU 30) terminates the main process without making a call via the NGN 8. The pattern A is implemented, for example, in a situation where it is impossible to establish a connection with the NGN 8 when the NGN transmission setting is set "ON" and the fallback setting is set "OFF." Further, examples of the situation where it is impossible to establish a connection with the NGN 8 include a situation where there is no contract concluded with a provider that provides the NGN 8 and a situation where the fax machine 10 is not connected with the cable of the LAN 6. In the following description, an explanation will be provided about a case where the fax machine 10 is not connected with the cable of the LAN 6.

Figure 4:
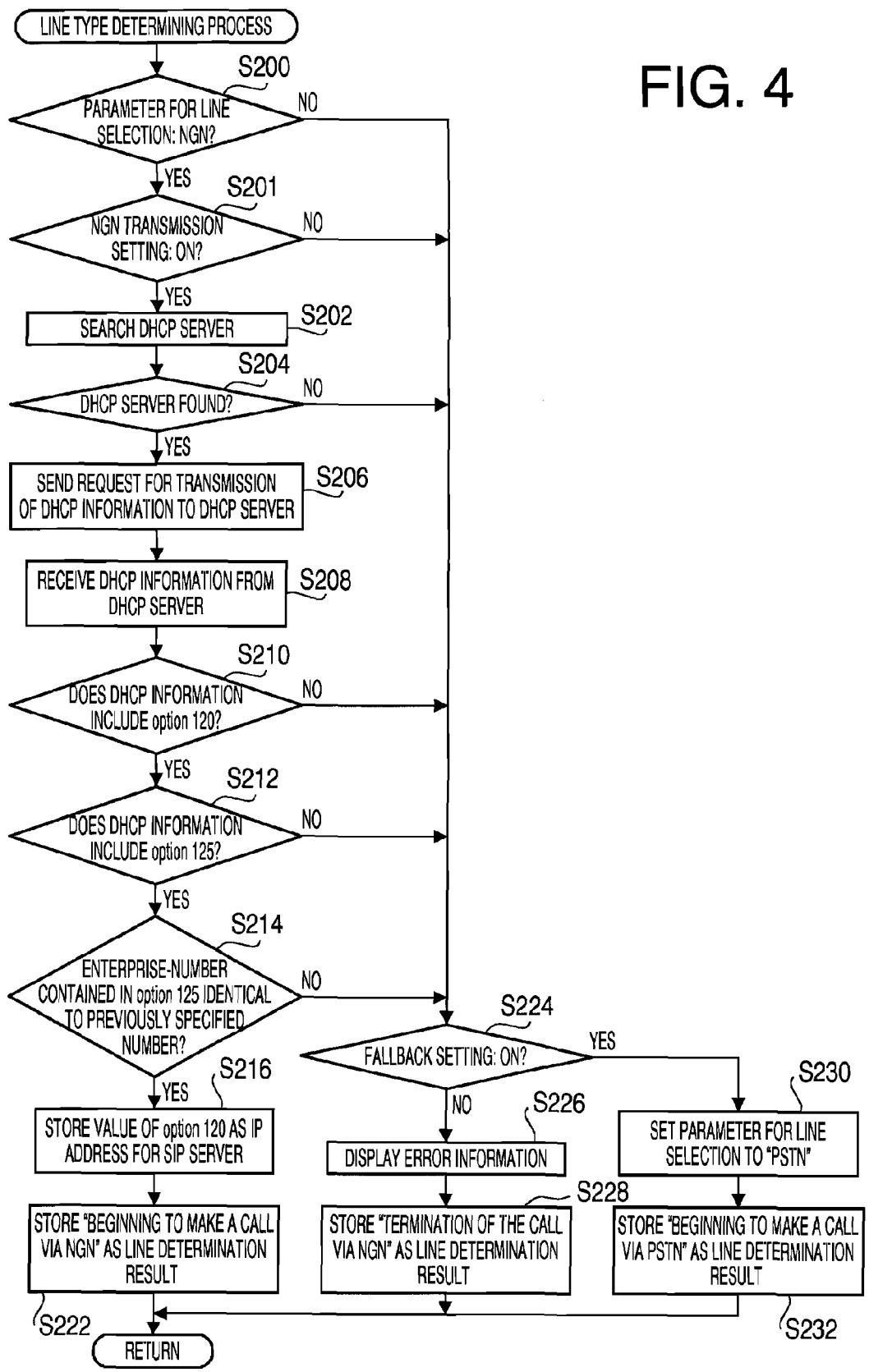
FIG. 4 is a flowchart showing a procedure of a line type determining process to be executed by (the CPU of) the fax machine in the first embodiment according to one or more aspects of the present invention.

In this case, the NGN transmission setting is "ON" (see FIG. 4, S201: Yes). However, since the fax machine 10 is not connected with the cable of the LAN 6, the fax machine 10 cannot establish a connection with the DHCP server 70 or find the DHCP server 70 (S204: No). Further, the fallback setting is "OFF" (S224: No). Therefore, the error information that it is impossible to perform fax communication is displayed on the display unit 12 (S226), and the line determination result "termination of the call via NGN" is stored onto the memory 32 (S228). Thus, the fax machine 10 (the CPU 30) terminates the main process without making a call via the NGN 8.

Additionally, the pattern A is implemented in another situation where the NGN transmission setting is "OFF" (S201: No) and the fallback setting is "OFF" (S224: No). In this case as well, the fax machine 10 (the CPU 30) displays on the display unit 12 the error information that it is impossible to perform fax communication (S226), and terminates the main process without making a call via the NGN 8.

The pattern B will be described. The pattern B is an operation pattern in which operations are performed sequentially in the following order: making a call via the NGN 8→(the redialing process) making a call via the NGN 8→(the redialing process) making a call via the NGN 8→(the fallback process) making a call via the PSTN 4→termination. The pattern B is implemented, for instance, in a situation where an error to be settled by the redialing process is detected when the NGN transmission setting is "ON," the fallback setting is "ON," the maximum permissible number of redials is "Three," and it is understood that the party device (i.e., the fax machine 110) can perform transmission using the NGN 8. Further, examples of the error to be settled by the redialing process include "486 Busy Here" and "480 Temporarily Unavailable." In the following description, an explanation will be provided about a case where the party device is busy and the fax machine 10 receives the error "486 Busy Here."

In this case, it is confirmed that the NGN transmission setting is "ON" (see FIG. 4, S201: Yes) and that the NGN 8 is available (S210: Yes, S212: Yes, and S214: Yes). Therefore, the fax machine 10 (the CPU 30) stores the line determination result "beginning to make a call via NGN" onto the memory 32 (S222), and transmits the INVITE (S144). However, since the fax machine 110 is busy, the fax machine 10 receives the error "486 Busy Here" without receiving the 2000K (S146: No). The received error is not an error to be settled by the fallback process (S314: No) but an error to be settled by the redialing process (S318: Yes). Therefore, the fax machine 10 increments the number of redials from zero to one (S320). Then, the fax machine 10 sets "Redialing" for the fax job using the NGN 8, and sets the timer to the predetermined time (five minutes) (S326). Thereafter, five minutes later (S114: Yes), the fax machine 10 performs the redialing process using the NGN 8 (the first attempt) (S222 and S152).

As the party device (i.e., the fax machine 110) is still busy in the first attempt of the redialing process, as described above, the fax machine 10 again receives the error "486 Busy Here" (S146: No). In addition, the fax machine 10 increments the number of redials to two (S320). Thereafter, five minutes later (S114: Yes), the fax machine 10 performs the redialing process using the NGN 8 (the second attempt) (S222 and S152).

As the party device is still busy in the second attempt of the redialing process, as described above, the fax machine 10 again receives the error "486 Busy Here." The fax machine 10 increments the number of redials to three (S320), and the number of redials reaches the maximum permissible number of redials (S322: Yes). As the fallback setting is "ON" (S328: Yes), the fax machine 10 sets "Redialing" for the fax job using the PSTN 4, and sets the timer to zero second (S332). Hence, immediately thereafter (S114: Yes), the fax machine 10 performs the fallback process using the PSTN 4 (S232 and S156).

In the fallback process, since the party device is busy, the fax machine 10 fails to communicate with the party device (S161: No). As the number of redials reaches the maximum permissible number of redials (S352: Yes), the fax machine 10 displays, on the display unit 12, the error report that the number of redials reaches the maximum permissible number of redials (S334) without performing the redialing process using the PSTN 4, and deletes the fax job (S336). Namely, the fax machine 10 cancels the fax job after only a single attempt to make a call via the PSTN 4. Thus, the operations in the pattern B are completed.

The pattern D will be described. The pattern D is an operation pattern in which operations are performed sequentially in the following order: making a call via the NGN 8→(the fallback process) making a call via the PSTN 4→(the redialing process) making a call via the NGN 8→(the fallback process) making a call via the PSTN 4→(the redialing process) making a call via the NGN 8→(the fallback process) making a call via the PSTN 4→termination. The pattern D is implemented, for instance, in a situation where an error to be settled by the fallback process is detected when the NGN transmission setting is "ON," the fallback setting is "ON," and the maximum permissible number of redials is "Three." Further, examples of the error to be settled by the fallback process include errors indicating that a party device does not comply with the NGN 8 (e.g., "403 Forbidden," "404 Not Found," and "488 Not Acceptable Here") and "Communication Error." In the following description, an explanation will be provided about a case where the fax machine 10 receives the "Communication Error," and another explanation will be about a case where the party device is busy.

In this case, it is confirmed that the NGN transmission setting is "ON" (see FIG. 4, S201: Yes) and that the NGN 8 is available (S210: Yes, S212: Yes, and S214: Yes). Therefore, the fax machine 10 sends the INVITE (S144), but fails to receive the 2000K due to a communication error (S146: No) and receives the time-out error in communication with the SIP server 60. The received error is an error to be settled by the fallback error (S314: Yes), and the fallback setting is "ON" (S316: Yes). Hence, the fax machine 10 sets "Redialing" for the fax job using the PSTN 4, and sets the timer to zero second (S322). Thus, immediately thereafter (S114: Yes), the fax machine 10 performs the fallback process using the PSTN 4 (the first attempt) (S232 and S156).

As the party device (i.e., the fax machine 110) is still busy in the first attempt of the fallback process, the fax machine 10 fails to communicate with the party device (S161: No). Since such an error that the party device is busy is an error to be settled by the redialing process (S348: Yes), the fax machine 10 increments the number of redials to one (S350). Then, the fax machine 10 sets "Redialing" for the fax job using the NGN 8, and sets the timer to the predetermined time (five minutes) (S356). Thereafter, five minutes later (S114: Yes), the fax machine 10 performs the redialing process using the NGN 8 (the first attempt) (S222 and S152).

As the communication error is not settled by the first attempt of the redialing process, as described above, the fax machine 10 again receives the time-out error (S146: No). Since the received error is an error to be settled by the fallback process (S314: Yes), the fax machine 10 sets "Redialing" for the fax job using the PSTN 4 (S332). Immediately thereafter (S114: Yes), the fax machine 10 performs the fallback process using the PSTN 4 (the second attempt) (S232 and S156).

In the same manner as above, five minutes later, the fax machine 10 performs the redialing process using the NGN 8 (the second attempt) (S222 and S152), and immediately thereafter, the fax machine 10 performs the fallback process using the PSTN 4 (the third attempt) (S232 and S156). After that, the number of redials reaches the maximum permissible number of redials (S352: Yes), and the fax machine 10 displays, on the display unit 12, the error report that the number of redials reaches the maximum permissible number of redials (S334). Then, the fax machine 10 deletes the fax job (S336). Thus, the operations in the pattern D are completed.

Compared with the below-mentioned pattern C, the pattern D allows a larger number of calls (redials) using the NGN 8. Hence, when the communication using the NGN 8 provides more advantages such as a lower call rate and a faster communication speed than the communication using the PSTN 4, it is possible to meet such a user's request that the user wish to use the NGN 8 rather than the PSTN 4. Thereby, it is possible to enhance user-friendliness of the communication system 2 (the fax machine 10). Further, the "Communication Error" is an error that could be settled in a highly effective manner by applying the pattern D. This is because, among errors to be settled by the fallback process, the "Communication Error" is the most likely to allow the communication using the NGN 8 to be successfully performed and could be settled in the most effective manner by increasing the number of calls (redials) using the NGN 8.

(Effects)

When determining that the fax machine 10 is unlikely to successfully perform the redialing process (i.e., the process to make redialing using the NGN 8 after waiting for a predetermined time), the fax machine 10 performs the fallback process (i.e., the process to make redialing using the PSTN 4 to replace the NGN 8) only in the case where the setting for performing the fallback process is configured (the fallback setting: ON). Further, when detecting an error to be settled by the redialing process (i.e., an error to be issued in a situation where the communication using the NGN 8 is likely to be rendered available by making redialing after waiting for a predetermined time), the fax machine 10 performs the redialing process using the NGN 8 without immediately performing the fallback process. Thereby, it is possible to control the fax machine 10 in line with a user's request, for instance, to preferentially use the NGN 8 that costs more in comparison with usage of the PSTN 4.

Further, when detecting an error to be settled by the fallback process (i.e., such an error that the communication using the NGN 8 is unlikely to be successfully performed), the fax machine 10 immediately performs the fallback process using the PSTN 4 without performing the redialing process using the NGN 8. Thereby, it is possible to reduce a useless waiting time and shorten a time required for the communication.

Further, when detecting an error to be settled by the fallback process, the fax machine 10 provides the user with a notification that the communication using the NGN 8 is unavailable. Thereby, it is possible to prevent the redialing process using the NGN 8 from being repeatedly attempted in a useless manner.

Further, the fax machine 10 is configured to automatically repeat (an attempt of) the redialing process up to the maximum permissible number of redials. Therefore, it is possible to enhance user-friendliness of the fax machine 10.

Second Embodiment

A second embodiment will be described. In the second embodiment, the flow of the error result registering process (S162) is partially changed. Specifically, in the second embodiment, a flow shown in FIG. 7 is applied to the error result registering process, instead of the flow shown in FIG. 6. It is noted that, in the second embodiment, the configuration of the communication system 2 is the same as that of the first embodiment. Thus, a detailed explanation about the configuration of the communication system 2 will be omitted.

Figure 6:
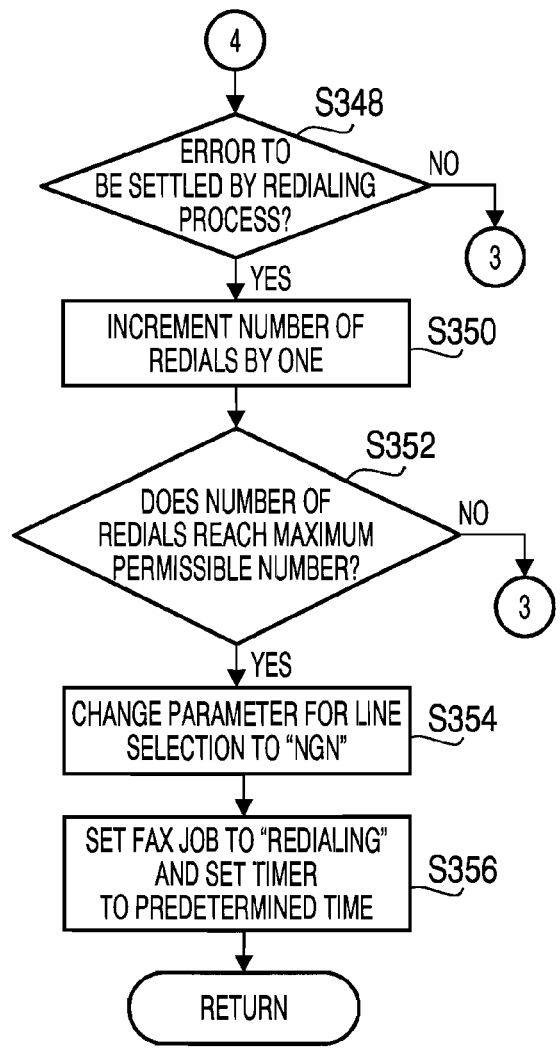
Figure 7:
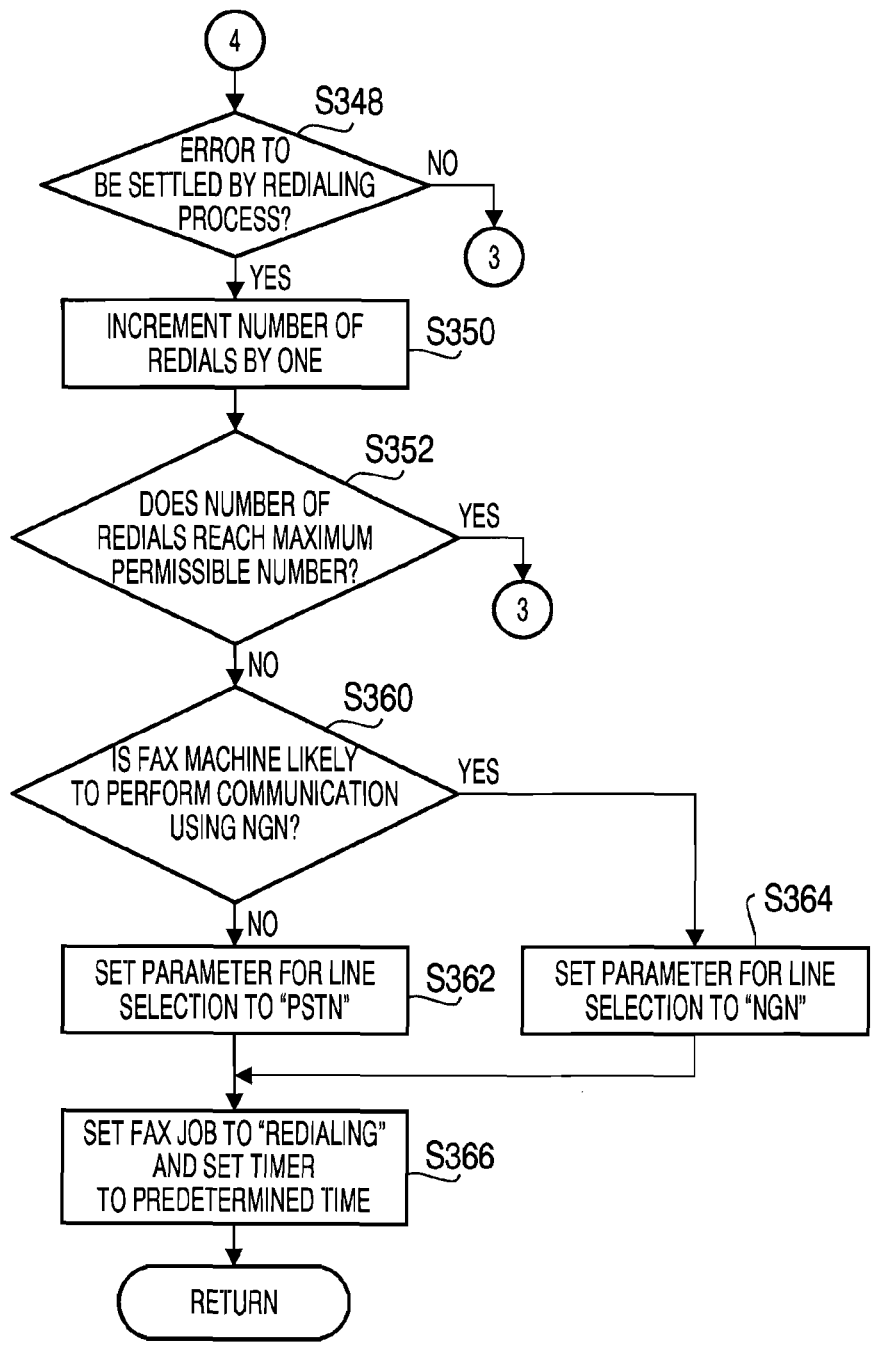
FIG. 7 is a flowchart showing a part of the error result registering process in a second embodiment according to one or more aspects of the present invention.

In FIG. 7, the steps S348 to S352 are the same as the steps S348 to S352 shown in FIG. 6, respectively. Therefore, detailed explanations about the steps S348 to S352 will be omitted. When determining that the number of redials does not reach the maximum permissible number of redials (S352: No), the CPU 30 goes to S360. In S360, the CPU 30 determines whether the communication using the NGN 8 is likely to be successfully performed. As described above, the determination is made by analyzing the caused error. When determining that the communication using the NGN 8 is likely to be successfully performed (S360: Yes), the CPU 30 goes to S364, in which the CPU 30 sets the parameter for line selection to "NGN." When determining that the communication using the NGN 8 is not likely to be successfully performed (S360: No), the CPU 30 sets the parameter for line selection to "PSTN." Then, in S366, the CPU 30 sets the fax job to "Redialing." Additionally, the CPU 30 sets the timer to a predetermined time (for example, five minutes). Thereafter, the CPU 30 terminates the error result registering process.

(Operations)

Actual operations in the flow shown in FIG. 7 will be exemplified. The operation pattern C will be described below. It is noted that the following description will be provided under an assumption that the same error is caused again.

The pattern C is an operation pattern in which operations are performed sequentially in the following order: making a call via the NGN 8→(the fallback process) making a call via the PSTN 4→(the redialing process) making a call via the PSTN 4→(the redialing process) making a call via the PSTN 4→termination. The pattern C is implemented, for instance, in a situation where an error to be settled by the fallback process is detected when the NGN transmission setting is "ON," the fallback setting is "ON," the maximum permissible number of redials is "Three." In the following description, an explanation will be provided about a case where the number for the party device (i.e., the fax machine 110) is not registered in the SIP server 60 and the fax machine 10 receives the error "404 Not Found" (i.e., such an error that the communication using the NGN 8 is unlikely to be successfully performed). Further, another explanation will be about a case where the party device is busy.

In this case, immediately after making a call via the NGN 8, the fax machine 10 performs the fallback process using the PSTN 4 (the first attempt) (S232 and S156). As the party device is busy in the first attempt of the fallback process, the fax machine 10 (the CPU 30) fails to communicate with the party device (S161: No). The fax machine 10 increments the number of redials to one (S350) and determines that the fax machine 10 is not likely to successfully perform communication using the NGN 8 (S360: No). Hence, the fax machine 10 sets the parameter for line selection to "PSTN" (S362), and sets the fax job to "Redialing" (S366).

Then, five minutes later (S114: Yes), the fax machine 10 performs the redialing process using the PSTN 4 (the first attempt) (S232 and S156). As the party device is busy in the first attempt of the redialing process, the fax machine 10 fails to communicate with the party device (S11: No). The fax machine 10 increments the number of redials to two (S350), sets the parameter for line selection to "PSTN" (S362), and sets the fax job to "Redialing" (S366).

In the same manner as above, five minutes later, the fax machine 10 performs the redialing process using the PSTN 4 (the second attempt) (S232 and S156). Thereafter, the number of redials reaches the maximum permissible number of redials (three) (S352: Yes), and the fax machine 10 displays on the display unit 12 the error information that it is impossible to perform fax communication (S334). Thereafter, the fax machine 10 deletes the fax job (S336). Thus, the operations in the pattern C are completed.

In the pattern C, responsive to becoming aware that the destination device does not comply with the NGN 8, the fax machine 10 performs only the redialing process using the PSTN 4. Thereby, it is possible to prevent the redialing process using the NGN 8 from being repeatedly attempted in a useless manner.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are feasible.

<Modifications>

The NGN 8 is not limited to a next generation network (NGN) but may be an IPv4 network or an IPv6 network. In this case, the mapping between the SIPURI and the general fax number is not implemented. Therefore, to perform the IPFAX process using the fax machine 10, the user needs to input, into the fax machine 10, data different from the general fax number.

Further, the "Communication Error" may be defined as an error to be settled by the redialing process, instead of an error to be settled by the fallback process. Furthermore, examples of the error to be settled by the fallback process and the error to be settled by the redialing process may include various errors other than the errors exemplified in the aforementioned embodiments.

The enterprise-number may be stored onto the enterprise-number table 35 by the user. Further, the enterprise-number may previously be stored on the enterprise-number table 35 by the vender of the fax machine 10. Furthermore, for instance, the fax machine 10 may acquire the enterprise-number from a predetermined server (e.g., a server that the vender of the fax machine 10 provides) and store the acquired enterprise-number onto the enterprise-number table 35.

In the aforementioned embodiments, the determination as to whether the fax machine 10 can use the IPFAX function is made using the enterprise-number. However, for instance, the user may previously store, onto the memory 32, state information indicating whether the fax machine 10 is in a state of being able to use the IPFAX function. In this case, the CPU 30 may determine whether the fax machine 10 is in the state of being able to use the IPFAX function, based on the state information stored on the memory 32 by the user.

In the aforementioned embodiments, the IPFAX process is cited as an example of IP communication processes. However, aspects of the present invention may be applied to the IP phone. Specifically, instead of the fax machine 10 exemplified in the aforementioned embodiments, a phone device may be connected with the PSTN 4 and the NGN 8. In this case, sound data (voice) communication using the NGN 8 may be performed as an example of the IP communication processes.

Acquiring and storing onto the memory 32 the IP address and the SIP domain name of the SIP server 60 may automatically be done in an arbitrary method. For example, the DHCP server 70 may previously store therein the IP address and the SIP domain name of the SIP server 60. In this case, for instance, the CPU 30 may acquire and store onto the memory 32 the IP address and the SIP domain name of the SIP server 60, concurrently when acquiring the DHCP information in S208 shown in FIG. 4.

Further, the step S210 shown in FIG. 4 may be canceled. In this case, after acquiring the DHCP information (S208), the CPU 30 may advance to S212 and S214 without executing S210. Further, after determining that the enterprise-number contained in the option 125 is not identical to the enterprise-number for the contract provider (S214: Yes) and storing information indicating the state where the fax machine 10 can use the IPFAX function, the CPU 30 may store, onto the memory 32, the information of the option 120 contained in the DHCP information acquired in S208 as the IP address for the SIP server 60. It is noted that the CPU 30 may not store the IP address for the SIP server 60 onto the memory 32 when the DHCP information does not contain the information of the option 120.

Figure 3:
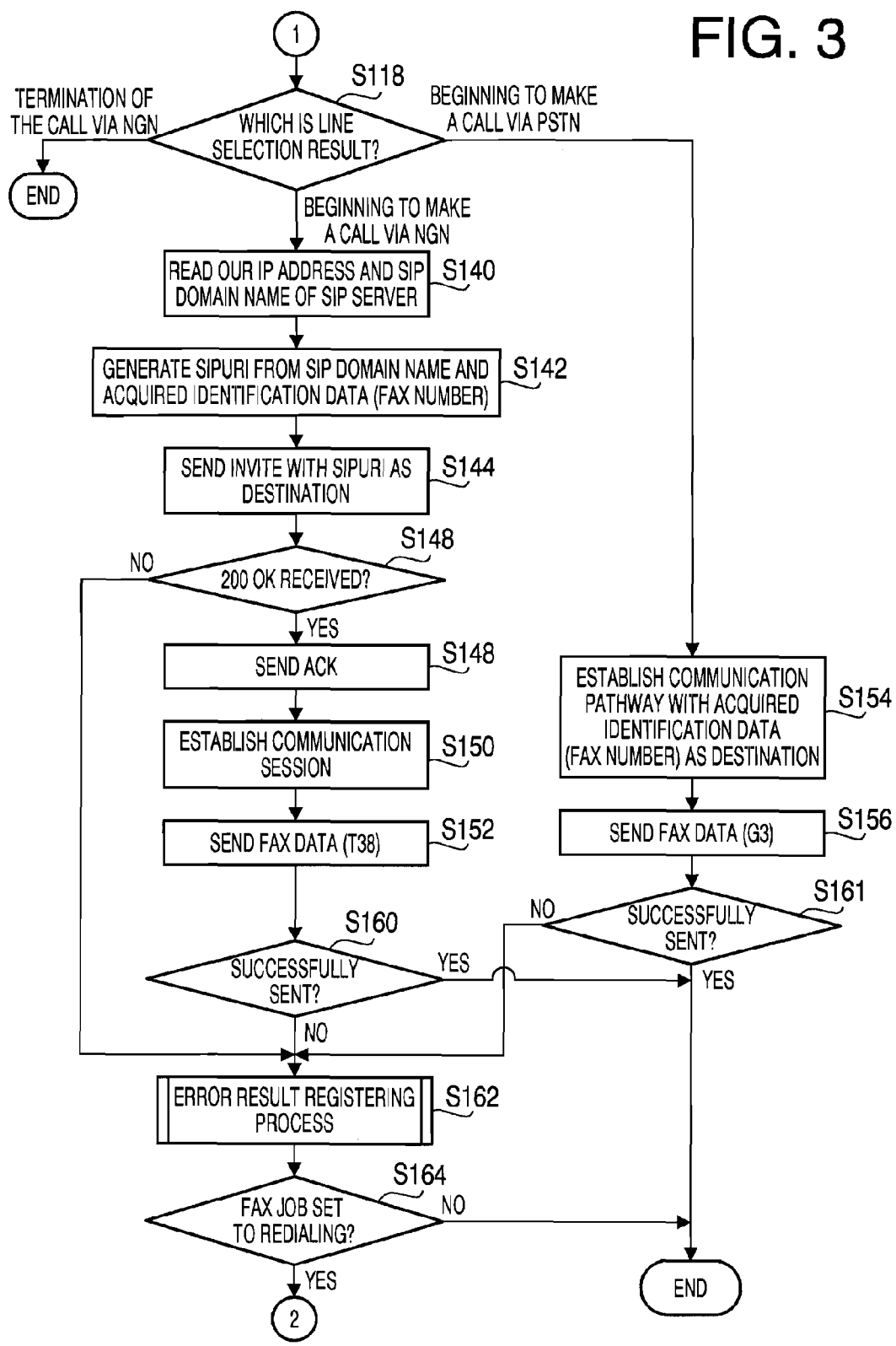

In the aforementioned embodiments, when performing the IPFAX transmission process, after establishment of the communication session between the fax machine 10 and the fax machine 110, the CPU 30 sends the fax data to the fax machine 110 without involving the SIP server 60 (see S152 in FIG. 3). Alternatively, after establishment of the communication session between the fax machine 10 and the fax machine 110, the IP process communication unit 40 may send the fax data to the fax machine 110 via the SIP server 60.

What is claimed is:

1. A communication device configured to be connected with a public network and an IP network, comprising;
   a communication controller configured to selectively perform one of:
      a public line communication process via the public network using general identification data for the public network; and
      an IP communication process via the IP network using IP identification data for the IP network;
   a setting unit configured to configure a setting as to whether to perform a fallback process to attempt the public line communication process via the public network after switching from the IP communication process via the IP network to the public line communication process via the public network;
   a first detector configured to detect whether the IP communication process is successfully performed and to acquire communication error information when detecting that the IP communication process is not successfully performed;
   a first determining unit configured to determine whether a redialing process to reattempt the IP communication process via the IP network is unlikely to be successfully performed, based on the communication error information acquired by the first detector; and
   a second determining unit configured to determine whether the IP communication process via the IP network is temporarily unavailable, based on the communication error information acquired by the first detector,
   wherein, when the first determining unit determines that the redialing process via the IP network is unlikely to be successfully performed, the communication controller performs the fallback process in a situation where the setting for performing the fallback process is configured by the setting unit,
   wherein, when the first determining unit determines that the redialing process via the IP network is not unlikely to be successfully performed and the second determining unit determines that the IP communication process via the IP network is temporarily unavailable, the communication controller performs the redialing process,
   wherein, when the first determining unit determines that the redialing process via the IP network is not unlikely to be successfully performed and the second determining unit determines that the IP communication process via the IP network is not temporarily unavailable, the communication controller provides a notification that it is impossible to perform communication, and
   wherein a first timer interval from a time when the first determining unit determines that the redialing process via the IP network is unlikely to be successfully performed to a time when the communication controller performs the fallback process is set shorter than a second time interval from a time when the second determining unit determines that the IP communication process via the IP network is temporarily unavailable to a time when the communication controller performs the redialing process.

2. The communication device according to claim 1, further comprising a second detector configured to detect whether an attempt number of attempts to perform the redialing process reaches a predetermined number,
   wherein, when the first determining unit determines that the redialing process via the IP network is not unlikely to be successfully performed and the second determining unit determines that the IP communication process via the IP network is temporarily unavailable, the communication controller performs the redialing process in a case where the second detector detects that the attempt number does not reach the predetermined number and provides a notification that it is impossible to perform communication in a case where the second detector detects that the attempt number reaches the predetermined number.

3. The communication device according to claim 1,
   wherein the first determining unit determines that the redialing process is unlikely to be successfully performed, when the communication error information acquired by the first detector indicates that a destination device with which the communication device attempts to communicate does not comply with the IP communication process.

4. The communication device according to claim 1,
   wherein the IP communication process is performed via a server connected with the IP network,
   wherein the first determining unit determines that the redialing process is unlikely to be successfully performed, when the communication error information acquired by the first detector indicates that it is impossible to establish communication with the server within a predetermined time period.

5. The communication device according to claim 1,
   wherein the first determining unit determines that the redialing process is unlikely to be successfully performed, when an error is caused during execution of the IP communication process with a destination device.

6. The communication device according to claim 1, further comprising:
   a third detector configured to detect whether the public line communication process via the public network is successfully performed in the fallback process and to acquire communication error information when detecting that the public line communication process via the public network is not successfully performed in the fallback process; and
   a third determining unit configured to determine whether the public line communication process via the public network is temporarily unavailable, based on the communication error information acquired by the third detector,
   wherein the communication controller performs a redialing process to reattempt the public line communication process via the public network when the third determining unit determines that the public line communication process via the public network is temporarily unavailable, and
   wherein the communication controller provides a notification that it is impossible to perform communication when the third determining unit determines that the public line communication process via the public network is not temporarily unavailable.

7. A communication device configured to be connected with a public network and an IP network, comprising:
   a communication controller configured to selectively perform one of:
      a public line communication process via the public network using general identification data for the public network; and
      an IP communication process via the IP network using IP identification data for the IP network;
   a setting unit configured to configure a setting as to whether to perform a fallback process to attempt the public line communication process via the public network after switching from the IP communication process via the IP network to the public line communication process via the public network;
a first detector configured to detect whether the IP communication process is successfully performed and to acquire communication error information when detecting that the IP communication process is not successfully performed;
a first determining unit configured to determine whether a redialing process to reattempt the IP communication process via the IP network is unlikely to be successfully performed, based on the communication error information acquired by the first detector,
a third detector configured to detect whether the public line communication process via the public network is successfully performed in the fallback process and to acquire communication error information when detecting that the public line communication process via the public network is not successfully performed in the fallback process; and
a third determining unit configured to determine whether the public line communication process via the public network is temporarily unavailable, based on the communication error information acquired by the third detector,
wherein, when the first determining unit determines that the redialing process via the IP network is unlikely to be successfully performed, the communication controller performs the fallback process in a situation where the setting for performing the fallback process is configured by the setting unit,
wherein, when the first determining unit determines that the redialing process via the IP network is not unlikely to be successfully performed, the communication controller performs the redialing process,
wherein the communication controller performs a redialing process to reattempt the public line communication process via the public network when the third determining unit determines that the public line communication process via the public network is temporarily unavailable,
wherein the communication controller provides a notification that it is impossible to perform communication when the third determining unit determines that the public line communication process via the public network is not temporarily unavailable, and
wherein a first timer interval from a time when the first determining unit determines that the redialing process via the IP network is unlikely to be successfully performed to a time when the communication controller performs the fallback process is set shorter than a second time interval from a time when the third determining unit determines that the public line communication process via the public network is temporarily unavailable to a time when the communication controller performs the redialing process.

8. The communication device according to claim 1, further comprising:
a processor;
a memory having computer readable instructions stored thereon that, when executed by the processor, cause the processor to provide:
the communication controller;
the setting unit;
the first detector;
the first determining unit; and
the second determining unit.

9. A non-transitory computer readable medium having computer readable instructions stored thereon, which, when executed by a processor connected with a public network and an IP network, cause the processor to:
selectively perform one of:
a public line communication process via the public network using general identification data for the public network; and
an IP communication process via the IP network using IP identification data for the IP network;
configure a setting as to whether to perform a fallback process to attempt the public line communication process via the public network after switching from the IP communication process via the IP network to the public line communication process via the public network;
determine whether the IP communication process is successfully performed;
acquire first communication error information when determining that the IP communication process is not successfully performed;
determine whether a redialing process to reattempt the IP communication process via the IP network is unlikely to be successfully performed, based on the first communication error information;
determine whether the IP communication process via the IP network is temporarily unavailable, based on the first communication error information;
when determining that the redialing process via the IP network is unlikely to be successfully performed, perform the fallback process in a situation where the setting for performing the fallback process is configured;
when determining that the redialing process via the IP network is not unlikely to be successfully performed and that the IP communication process via the IP network is temporarily unavailable, perform the redialing process; and
provide a notification that it is impossible to perform communication when determining that the redialing process via the IP network is not unlikely to be successfully performed and that the IP communication process via the IP network is not temporarily unavailable;
wherein a first timer interval from a time to determine that the redialing process via the IP network is unlikely to be successfully performed to a time to perform the fallback process is set shorter than a second time interval from a time to determine that the IP communication process via the IP network is temporarily unavailable to a time to perform the redialing process.

10. The non-transitory computer readable medium according to claim 9,
wherein the instructions, when executed by the processor, further cause the processor to:
determine whether an attempt number of attempts to perform the redialing process reaches a predetermined number;
perform the redialing process, when determining that the redialing process via the IP network is not unlikely to be successfully performed, that the IP communication process via the IP network is temporarily unavailable, and that the attempt number does not reach the predetermined number;
provide a notification that it is impossible to perform communication, when determining that the redialing process via the IP network is not unlikely to be successfully performed, that the IP communication process via the IP network is temporarily unavailable, and that the attempt number reaches the predetermined number.

11. The non-transitory computer readable medium according to claim 9,
wherein the instructions, when executed by the processor, cause the processor to determine that the redialing process is unlikely to be successfully performed, when the first communication error information indicates that a destination device does not comply with the IP communication process.

12. The non-transitory computer readable medium according to claim 9,
wherein the IP communication process is performed via a server connected with the IP network,
wherein the instructions, when executed by the processor, further cause the processor to determine that the redialing process is unlikely to be successfully performed, when first the communication error information indicates that it is impossible to establish communication with the server within a predetermined time period.

13. The non-transitory computer readable medium according to claim 9,
wherein the instructions, when executed by the processor, further cause the processor to determine that the redialing process is unlikely to be successfully performed, when an error is caused during execution of the IP communication process with a destination device.

14. The non-transitory computer readable medium according to claim 9,
wherein the instructions, when executed by the processor, further cause the processor to:
determine whether the public line communication process via the public network is successfully performed in the fallback process;
acquire second communication error information when determining that the public line communication process via the public network is not successfully performed in the fallback process;
determine whether the public line communication process via the public network is temporarily unavailable, based on the second communication error information;
perform a redialing process to reattempt the public line communication process via the public network when determining that the public line communication process via the public network is temporarily unavailable; and
provide a notification that it is impossible to perform communication when determining that the public line communication process via the public network is not temporarily unavailable.

15. A non-transitory computer readable medium having computer readable instructions stored thereon, which, when executed by a processor connected with a public network and an IP network, cause the processor to:
selectively perform one of:
a public line communication process via the public network using general identification data for the public network; and
an IP communication process via the IP network using IP identification data for the IP network;
configure a setting as to whether to perform a fallback process to attempt the public line communication process via the public network after switching from the IP communication process via the IP network to the public line communication process via the public network;
determine whether the IP communication process is successfully performed;
acquire first communication error information when determining that the IP communication process is not successfully performed;
determine whether a redialing process to reattempt the IP communication process via the IP network is unlikely to be successfully performed, based on the first communication error information;
determine whether the public line communication process via the public network is successfully performed in the fallback process;
acquire second communication error information when determining that the public line communication process via the public network is not successfully performed in the fallback process;
determine whether the public line communication process via the public network is temporarily unavailable, based on the second communication error information;
perform a redialing process to reattempt the public line communication process via the public network when determining that the public line communication process via the public network is temporarily unavailable; and
provide a notification that it is impossible to perform communication when determining that the public line communication process via the public network is not temporarily unavailable,
wherein a first timer interval from a time to determine that the redialing process via the IP network is unlikely to be successfully performed to a time to perform the fallback process is set shorter than a second time interval from a time to determine that the public line communication process via the public network is temporarily unavailable to a time to perform the redialing process.

* * * * *